United States Patent
Li et al.

(10) Patent No.: US 11,899,972 B2
(45) Date of Patent: Feb. 13, 2024

(54) REDUCE READ COMMAND LATENCY IN PARTITION COMMAND SCHEDULING AT A MEMORY DEVICE

(71) Applicant: Micron Technology, Inc., Boise, ID (US)

(72) Inventors: Juane Li, Milpitas, CA (US); Fangfang Zhu, San Jose, CA (US); Jason Duong, San Jose, CA (US); Chih-Kuo Kao, Fremont, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 162 days.

(21) Appl. No.: 17/445,478

(22) Filed: Aug. 19, 2021

(65) Prior Publication Data
US 2023/0054363 A1 Feb. 23, 2023

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC .................................................... G06F 3/0659
See application file for complete search history.

(56) References Cited

U.S. PATENT DOCUMENTS

| 6,092,158 A * | 7/2000 | Harriman ............ G06F 13/1642 711/158 |
| 6,829,689 B1 * | 12/2004 | Van Dyke ........... G06F 13/1605 711/151 |
| 2012/0124294 A1 * | 5/2012 | Atkisson ............. G06F 12/0804 711/135 |
| 2016/0162186 A1 * | 6/2016 | Kashyap ............... G06F 3/0688 711/103 |
| 2017/0177240 A1 * | 6/2017 | Yu .......................... G06F 3/0653 |
| 2020/0089629 A1 * | 3/2020 | Wang .................. G06F 13/1626 |

* cited by examiner

Primary Examiner — Rocio Del Mar Perez-Velez
Assistant Examiner — Marwan Ayash
(74) Attorney, Agent, or Firm — Lowenstein Sandler LLP (57) ABSTRACT

A partition command from one of a plurality of write partition command queues or a plurality of read partition command queues is received. The received partition command is issued to a command processor of the sequencer component to be applied to one of the one or more memory devices. Responsive to receiving the partition command of the plurality of write partition command queues, whether a timeout threshold criterion pertaining to the plurality of read partition command queues is satisfied is determined. Responsive to determining that the timeout threshold criterion pertaining to the plurality of read partition command queues is not satisfied, whether a write threshold criterion pertaining to the plurality of write partition command queues is satisfied is determined. Responsive to determining that at least one of the timeout threshold criterion pertaining to the plurality of read partition command queues or the write threshold criterion pertaining to the plurality of write partition command queues is satisfied, partition commands of the plurality of read partition command queues is received.

15 Claims, 6 Drawing Sheets

Receive a partition command from one of a plurality of write partition command queues or a plurality of read partition command queues, wherein the received partition command is issued to a command processor of a sequencer component to be applied to one or more memory devices. 310

Responsive to receiving the partition command of the plurality of write partition command queues, determine whether a timeout threshold criterion pertaining to the plurality of read partition command queues is satisfied. 320

Responsive to determining that that the timeout threshold criterion pertaining to the plurality of read partition command queues is not satisfied, determine whether a write threshold criterion pertaining to the plurality of write partition command queues is satisfied. 330

Responsive to determining that at least one of the timeout threshold criterion pertaining to the plurality of read partition command queues or the write threshold criterion pertaining to the plurality of write partition command queues is satisfied, switch to receiving partition commands of the plurality of read partition command queues. 340

Receive a partition command from a plurality of write partition command queues, wherein the received partition command is issued to a command processor to be applied to a memory device. 410

Determine whether one of a first threshold criterion pertaining to the plurality of read command queues or a second threshold criterion pertaining to the plurality of write partition command queues is satisfied. 420

Responsive to one of the first threshold criterion or the second threshold criterion is satisfied, switch to receiving a partition command from a plurality of read partition command queues, wherein the received partition command is issued to a command processor to be applied to the memory device. 430

REDUCE READ COMMAND LATENCY IN PARTITION COMMAND SCHEDULING AT A MEMORY DEVICE

TECHNICAL FIELD

Embodiments of the disclosure relate generally to memory sub-systems, and more specifically, relate to reducing read command latency in partition command scheduling at a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to reducing read command latency in partition command scheduling at a memory device. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Other examples of non-volatile memory devices are described below in conjunction with FIG. 1. A non-volatile memory device is a package of one or more dies. Each die can consist of one or more partitions. Each partition consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

The memory sub-system can include a controller that performs various operations at particular memory device of the memory sub-system. For example, the controller can perform a read operation, write operation, or an erase operation at one or more of the memory devices. The controller can include multiple channels that are used to control the one or more of the memory devices. Each channel can correspond to a portion of the controller and interface components that are used to communicate with and perform operations at a respective memory device. For example, a first channel can be used to perform operations at a first memory device and a second channel can be used to perform operations at a second memory device. As such, different channels of the controller can access different memory devices of the memory sub-system.

In a conventional memory sub-system, a memory sub-system controller can include a sequencer component that is used to facilitate the performance of operations at the one or more of the memory devices through the different channels. The sequencer component can receive an operation that is to be performed at the memory sub-system and can further receive data corresponding to the operation when the operation corresponds to a write operation. For example, the sequencer component can separate the operation into sub-operations that are to be performed at different memory devices through different channels. As such, the sequencer component can determine the sub-operations for various memory devices at the channels of the controller when an operation is received by the memory sub-system.

The sequencer component of a conventional memory sub-system can determine the sub-operations (e.g., partition commands) for a single operation (e.g., command) at a particular time. For example, a single command to be performed by the memory sub-system can be received and corresponding partition commands can be determined for each respective memory device from which data is to be read or erased or to which data is to be written. After the partition commands have been determined, the sequencer component can determine operations for particular memory devices. The controller can use the sequencer component to operate on memory devices in a synchronous manner. For example, the controller can use the resulting operations of the partition command from the sequencer component to perform a particular type of command (e.g., a read command, write command, or erase command) at memory devices at a particular time and cannot perform another type of operation at the same time. In conventional memory sub-system, read commands result in more latency than write commands. Accordingly, when conventional memory sub-systems perform the operations on the memory devices in a synchronous manner, latency is significantly increased due to switching to perform the read command based on a particular time at which the operation is to be performed.

Aspects of the present disclosure address the above and other deficiencies by providing a memory sub-system that enables an arbiter of the sequencer to incorporate a configurable read partition command queue timeout (e.g., timeout threshold) with a write threshold to determine whether to switch from performing write commands on the memory device to performing read commands on the memory device. The configurable read partition command queue timeout refers to a predetermined time period for which each read command of the partition command queues remains in the read partition command queue prior to execution of the read command at the memory device. The write threshold refers to the larger of (i) a least amount of write commands to be issued to the memory device (e.g., serviced) or (ii) a ratio of the number of pending write commands to be issued to the memory. Accordingly, based on the write threshold and the configurable read partition command queue timeout, the arbiter can determine when to switch to performing read commands on the memory device.

Advantages of the present disclosure include, but are not limited to, reducing read command latency by switching from servicing of write commands to the memory device to servicing of read commands when at least one read partition command in the read partition command queue times out.

Figure 1:
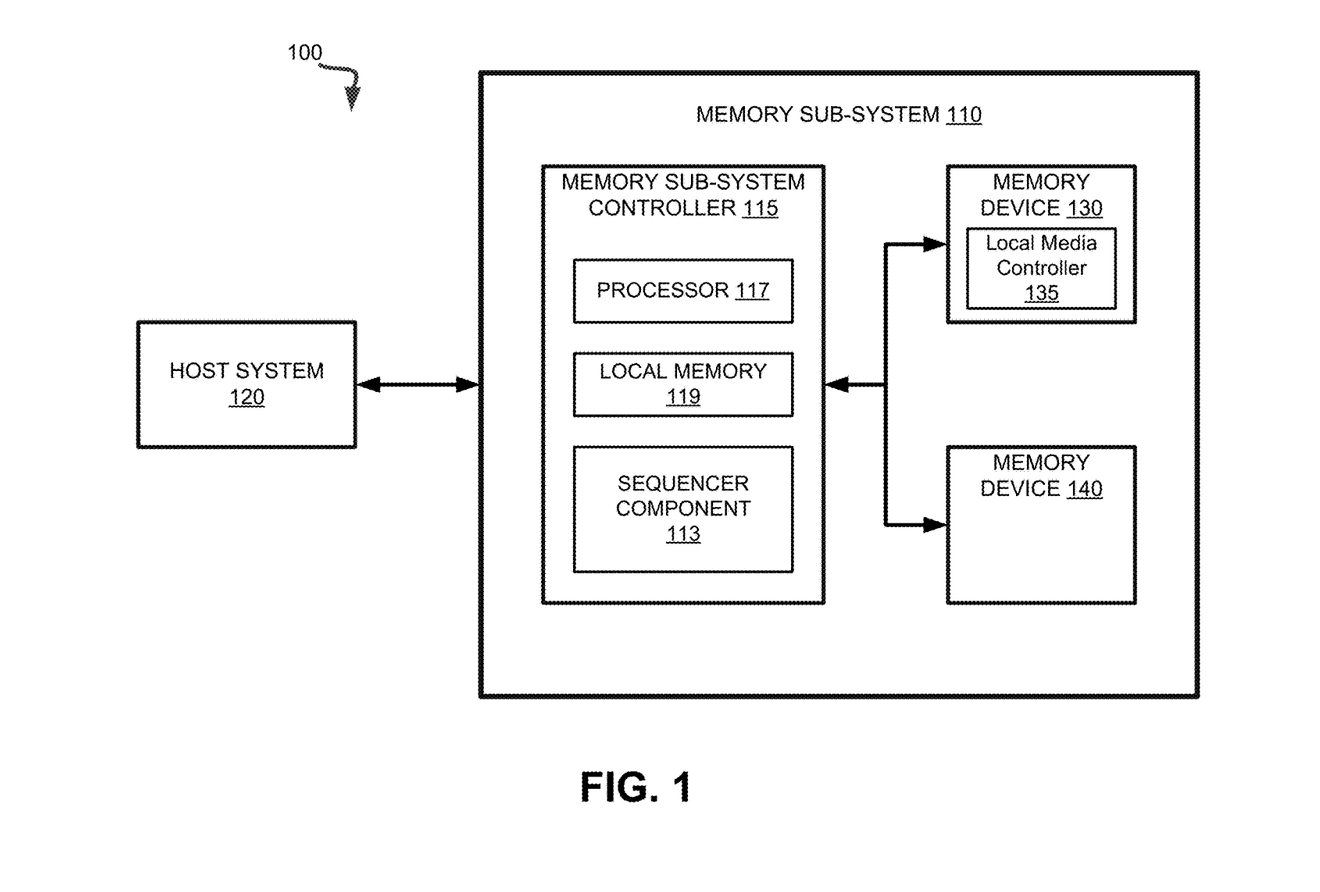
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a sequencer component 113 that can enable an arbiter to determine when to switch to servicing read commands on the memory device from servicing write commands on the memory device. In some embodiments, the memory sub-system controller 115 includes at least a portion of the sequencer component 113. In some embodiments, the sequencer component 113 is part of the host system 110, an application, or an operating system. In other embodiments, local media controller 135 includes at least a portion of sequencer component 113 and is configured to perform the functionality described herein.

The sequencer component 113 can receive a die command directed to one or more of the memory devices and stores each received die command into a die command queue. The sequencer component 113 partitions each die command in the die command queue into a plurality of partition commands. The sequencer component 113 maps the plurality of partition commands into a plurality of partition command queues of the one or more plurality of partition command queues (e.g., read partition command queues or write partition command queues) based on the command type of the plurality of partition commands (e.g., read command or write command). Each read partition command comprises an entry time which refers to the time the read partition command was mapped to at least one of the read partition command queues. An arbiter of the sequencer component 113 receives a partition command from either the read partition command queues or the write partition command queues for servicing (e.g., execute received partition command at the memory device). The arbiter of the sequencer component 113, based on the command type of the partition command, services the partition commands from one of the one or more plurality of partition command queues (e.g., write partition commands of the write partition command queues) until a criterion (e.g., write threshold criterion or a timeout threshold criterion) is satisfied. Once the criterion is satisfied, the arbiter of the sequencer component 113 switches to servicing another one of the one or more plurality of partition command queues (e.g., read partition commands of the read partition command queues) until a criterion (e.g., read threshold criterion) is satisfied. Further details with regards to the operations of the sequencer component 113 are described below.

Figure 2:
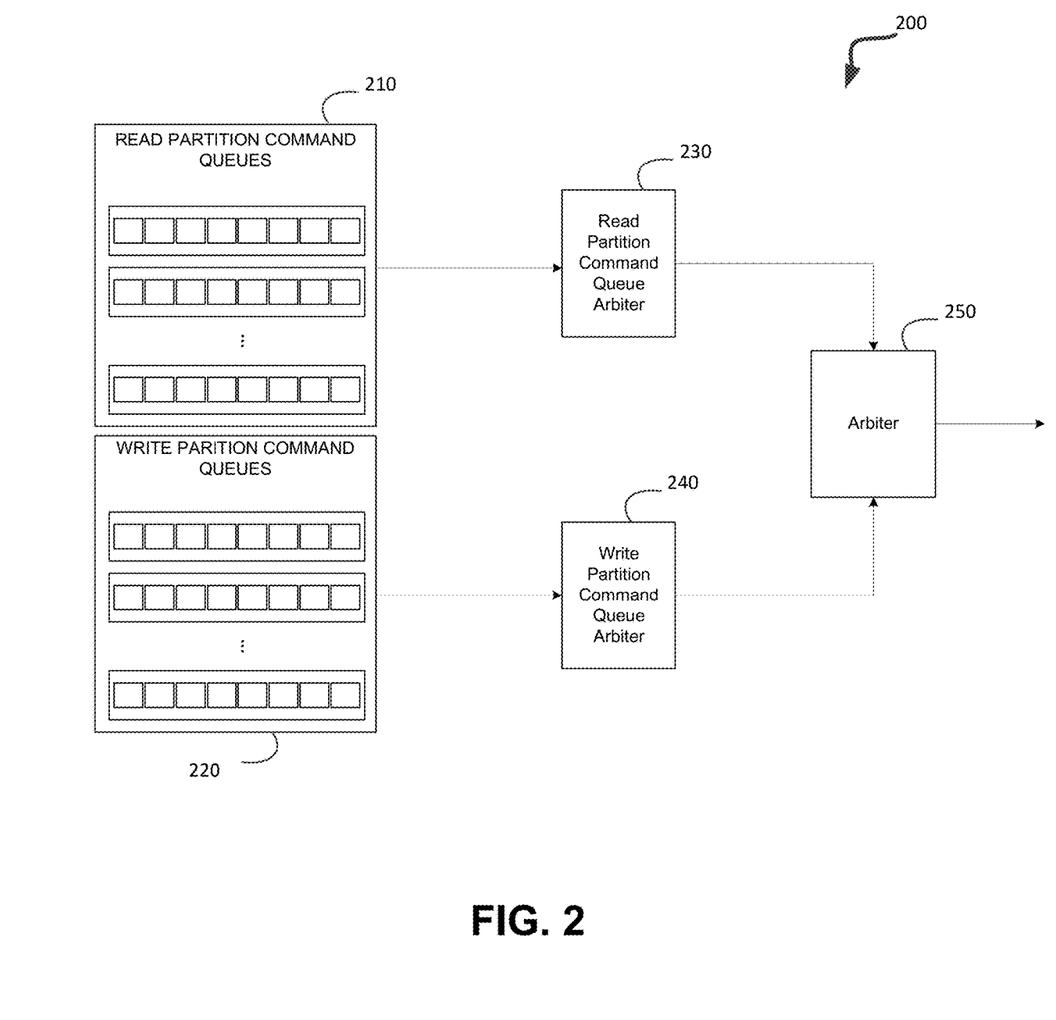
FIG. 2 is a block diagram illustrating partition command scheduling in accordance with some embodiments of the present disclosure.

FIG. 2 is a diagram illustrating partition command scheduling in accordance with some embodiments of the present disclosure. The sequencer component 200 (e.g., sequencer component 113) includes a plurality of read partition command queues 210 that can include at least one read partition command and a plurality of write partition command queues 220 that can include at least one write partition command. The plurality of read partition command queues 210 can send a read partition command from each of the plurality of read partition command queues 210 to a respective read partition command queue arbiter 230 to determine a read partition command from the plurality of read partition command queues 210 to send to arbiter 250. The plurality of write partition command queues 220 can send a write partition command from each of the plurality of write partition command queues 220 to a respective write partition command queue arbiter 240 to determine a write partition command from the plurality of write partition command queues 220 to send to arbiter 250. Depending on the embodiment, arbiter 250 may receive the read partition commands directly from the plurality of read partition command queues 210 and write partition command directly from the plurality of write partition command queues 220.

Figure 3:
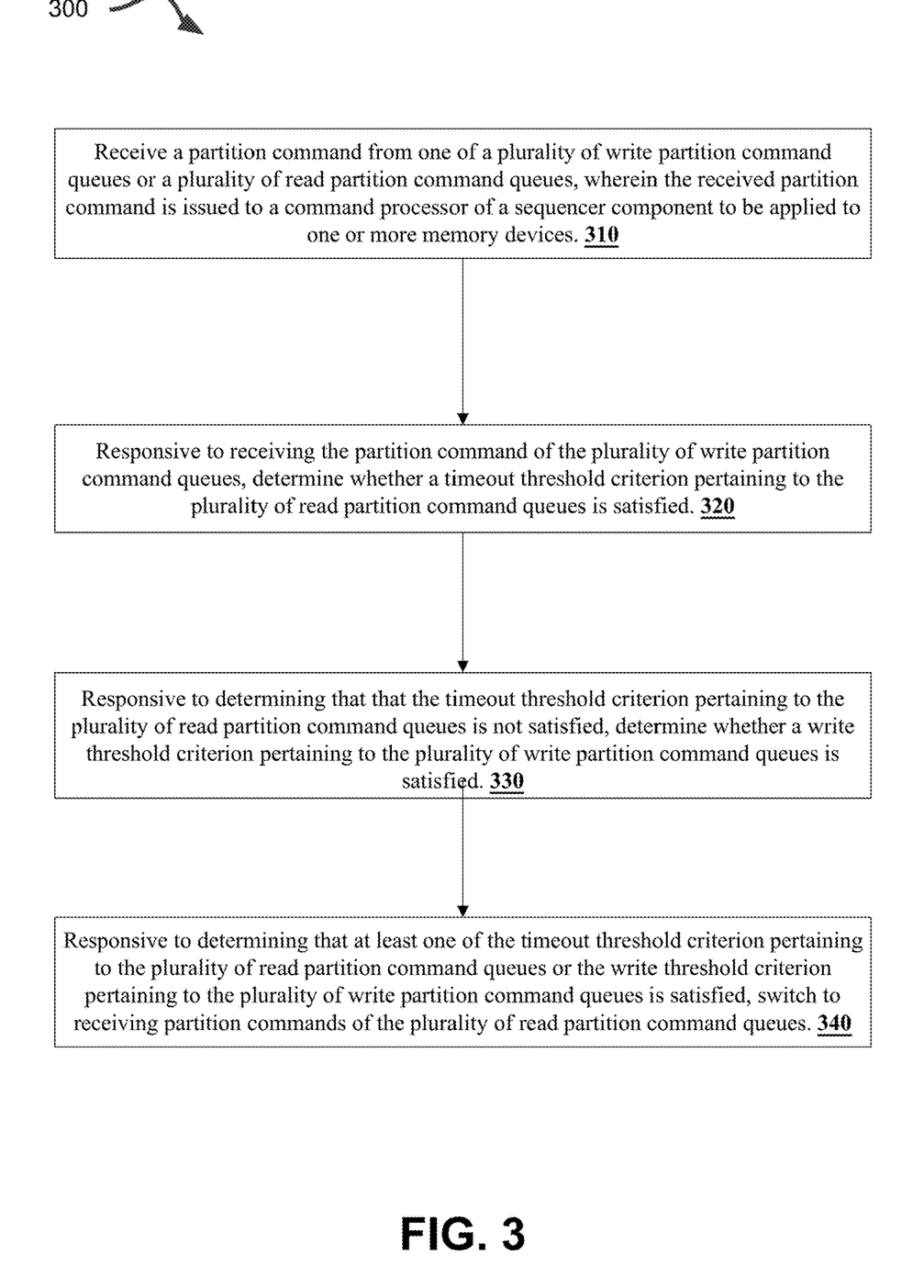
FIG. 3 is a flow diagram of an example method of reducing read command latency in partition command scheduling at a memory device in accordance with some embodiments of the present disclosure.

The arbiter 250 receives read commands from the plurality of read partition command queues 210 and write commands from the plurality of write partition command queues 220 in which the arbiter 250 determines which partition commands (e.g., read partition commands or write partition commands) to service based on criterions (e.g., read threshold criterion, write threshold criterion, or a timeout threshold criterion). Servicing commands comprises issuing the partition command to a command processor of the sequencer component to be applied to one of the one or more memory devices, such as memory device 130. FIG. 3 is a flow diagram of an example method 300 to reduce read command latency in partition command scheduling at a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a partition command from one of a plurality of write partition command queues 220 or a plurality of read partition command queues 210, wherein the received partition command is issued to a command processor of the sequencer component to be applied to one of the one or more memory devices, such as memory device 130.

At operation 320, responsive to receiving the partition command from the plurality of write partition command queues 220, the processing logic determines that a timeout threshold criterion pertaining to the plurality of read partition command queues is not satisfied. To determine whether the timeout threshold criterion pertaining to the plurality of read partition command queues 210 is satisfied, the processing logic determines whether a period of time between a time stamp of at least one partition command from the plurality of read partition command queues 210 and a current time exceeds a timeout threshold. The time stamp represents a time a respective partition command was received in the plurality of read partition command queue 210 from a die command queue of the sequencer component. The timeout threshold refers to a maximum duration (e.g., period) of time a partition command of the plurality of read partition command queues 210 can remain in a read partition command queue of the plurality of read partition command queues 210.

At operation 330, responsive to determining that the timeout threshold criterion pertaining to the plurality of read partition command queues 210 is not satisfied, the processing logic determines that a write threshold criterion pertaining to the plurality of write partition command queues 220 is satisfied. The write threshold criterion is satisfied in response to the processing logic determining that a number of partition commands of the plurality of write partition command queues 220 received meets or exceeds the write threshold. The write threshold refers to a larger of (i) a number of remaining partition commands of the plurality of write partition command queues 220 or (ii) a product of a minimum number of partition commands of the plurality of write partition command queues 220 to receive and a write transaction ratio (e.g., a value between 0 and 1).

At operation 340, responsive to determining that read partition command queues the write threshold criterion pertaining to the plurality of write partition command queues 220 is satisfied, the processing logic switches to receiving partition commands from the plurality of read partition command queues 210. To switch to receiving partition commands of the plurality of read partition command queues 210, the processing logic determines whether at least one of the plurality of read partition command queues 210 is ready to send a partition command and updates the read threshold. The read threshold refers to a larger of (i) a number of remaining partition commands of the plurality of read partition command queues 210 or (ii) a product of a minimum number of partition commands of the plurality of read partition command queues 210 to receive and a read transaction ratio (e.g., a value between 0 and 1). In addition, if the processing logic determines that the timeout threshold criterion pertaining to the plurality of read partition command queues is satisfied at operation 320, at operation 340, the processing logic can also switch to receiving partition commands from the plurality of read partition command queues as described above.

Depending on the embodiment, responsive to determining that the timeout threshold criterion pertaining to the plurality of read partition command queues 210 and the write threshold criterion pertaining to the plurality of write partition command queues 220 are not satisfied, the processing logic receives an additional partition command from one of the plurality of write partition command queues 220.

Figure 4:
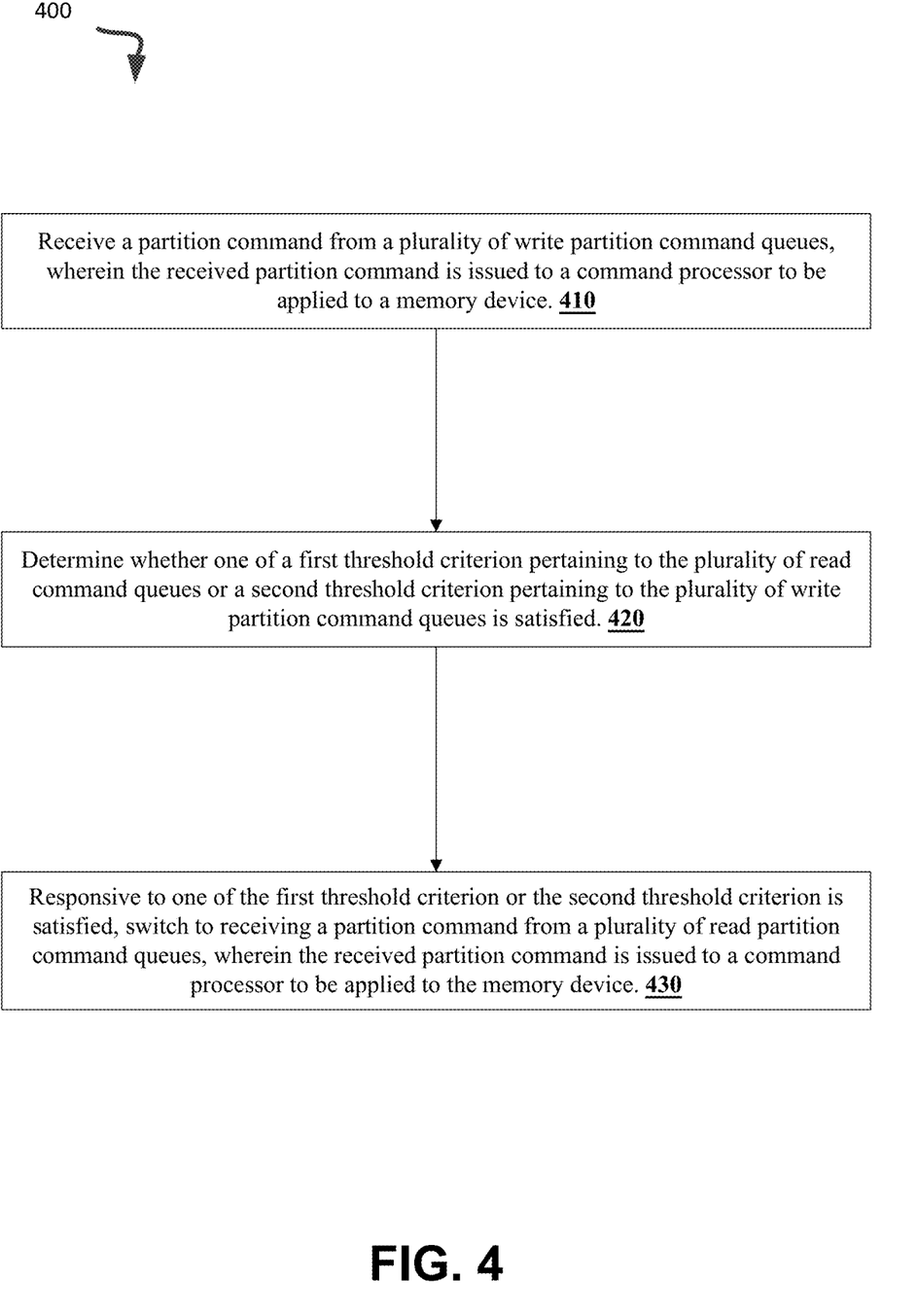
FIG. 4 is a flow diagram of an example method of reducing read command latency in partition command scheduling at a memory device in accordance with some embodiments of the present disclosure.

FIG. 4 is a flow diagram of an example method 400 to reduce read command latency in partition command scheduling at a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a partition command from a plurality of write partition command queues 220, wherein the received partition command is issued to a command processor to be applied to a memory device.

At operation 420, the processing logic determine whether one of a first threshold criterion pertaining to the plurality of read partition command queues 210 or a second threshold criterion pertaining to the plurality of write partition command queues 220 is satisfied.

The first threshold criterion refers to a timeout threshold criterion. As described previously, to determine that the timeout threshold criterion is satisfied, the processing logic determines whether a period of time between a time stamp of at least one partition command of the plurality of read partition command queues 210 and a current time exceeds a timeout threshold. The time stamp represents a time a respective partition command was received in the plurality of read partition command queue 220 from a die command queue of the sequencer component. The timeout threshold refers to a maximum duration of time a partition command of the plurality of read partition command queues 210 can remain in the plurality of read partition command queues 210.

The second threshold criterion refers to a write threshold criterion. As described previously, to determine that the write threshold criterion is satisfied, the processing logic determines whether a number of partition commands of the plurality of write partition command queues 220 received meets or exceeds the write threshold. The write threshold refers to a larger of (i) a number of remaining partition commands of the plurality of write partition command queues 220 or (ii) a product of a minimum number of partition commands of the plurality of write partition command queues 220 to receive and a write transaction ratio (e.g., a value between 0 and 1).

At operation 430, responsive to one of the first threshold criterion or the second threshold criterion is satisfied, the processing logic switches to receiving a partition command from a plurality of read partition command queues, wherein the received partition command is issued to a command processor to be applied to the memory device.

Figure 5:
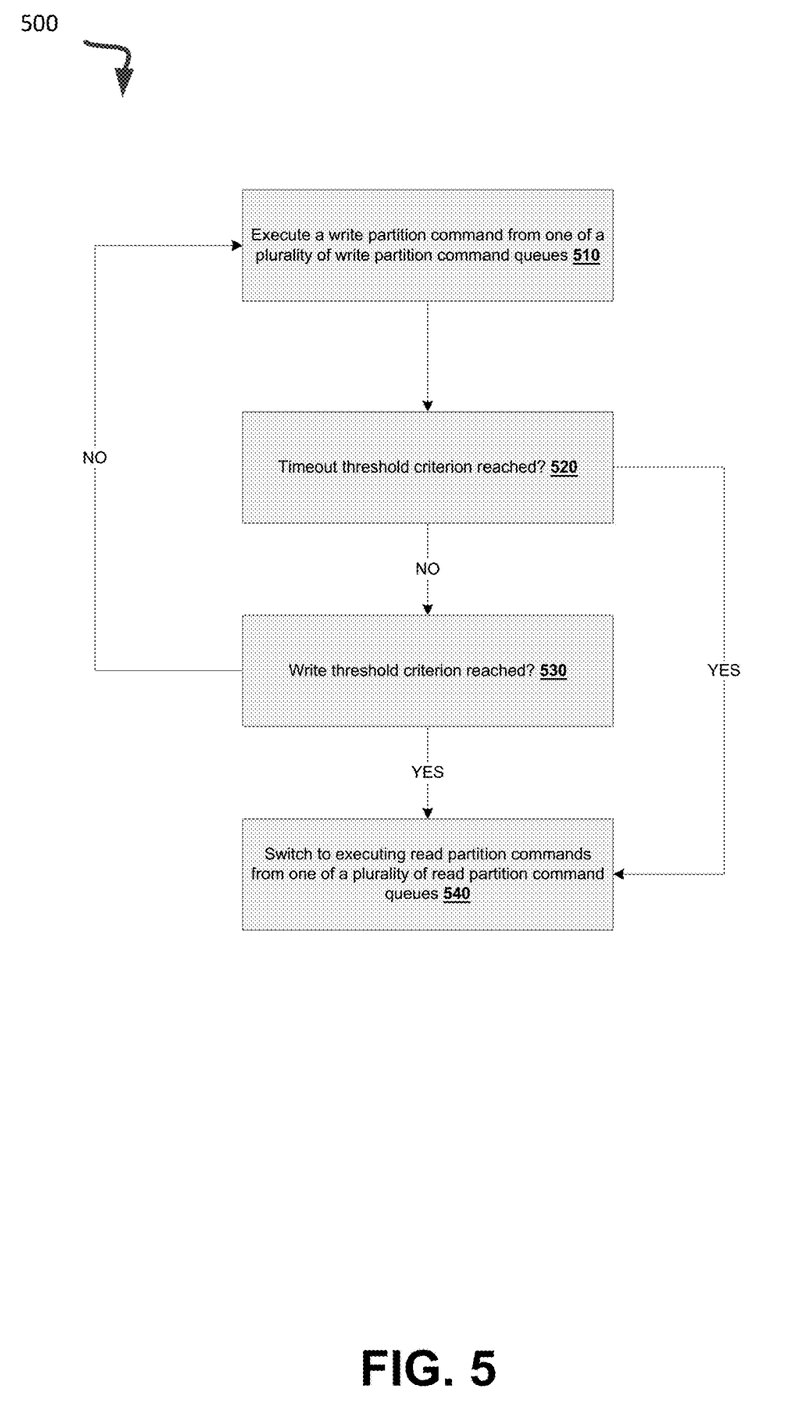
FIG. 5 is a flow diagram of an example method of reducing read command latency in partition command scheduling at a memory device in accordance with some embodiments of the present disclosure.

FIG. 5 is a flow diagram of an example method 500 to reduce read command latency in partition command scheduling at a memory device, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic executes a write partition command from one of a plurality of write partition command queue. The processing logic, at operation 520, determines whether a timeout threshold criterion is reached. As described previously, to determine that the timeout threshold criterion is reached, the processing logic determines whether a period of time between a time stamp of at least one partition command of the plurality of read partition command queues and a current time exceeds a timeout threshold. The time stamp represents a time a respective partition command was received in the plurality of read partition command queue from a die command queue of the sequencer component. The timeout threshold refers to a maximum duration of time a partition command of the plurality of read partition command queues can remain in the plurality of read partition command queues.

Responsive to determining that the timeout threshold criterion is reached, at operation 440, the processing logic switches to executing read partition commands from one of a plurality of read partition command queues.

Responsive to determining that the timeout threshold criterion is not reached, at operation 530, the processing logic determines whether a write threshold criterion is reached. As described previously, to determine that the write threshold criterion is reached, the processing logic determines whether a number of partition commands of the plurality of write partition command queues received meets or exceeds the write threshold. The write threshold refers to a larger of (i) a number of remaining partition commands of the plurality of write partition command queues or (ii) a product of a minimum number of partition commands of the plurality of write partition command queues to receive and a write transaction ratio (e.g., a value between 0 and 1). Responsive to determining that the write threshold criterion is reached, at operation 440, the processing logic switches to executing read partition commands from one of a plurality of read partition command queues.

Responsive to determining that the timeout threshold criterion is not reached, at operation 510, the processing logic executes a write partition command from one of a plurality of write partition command queue.

Figure 6:
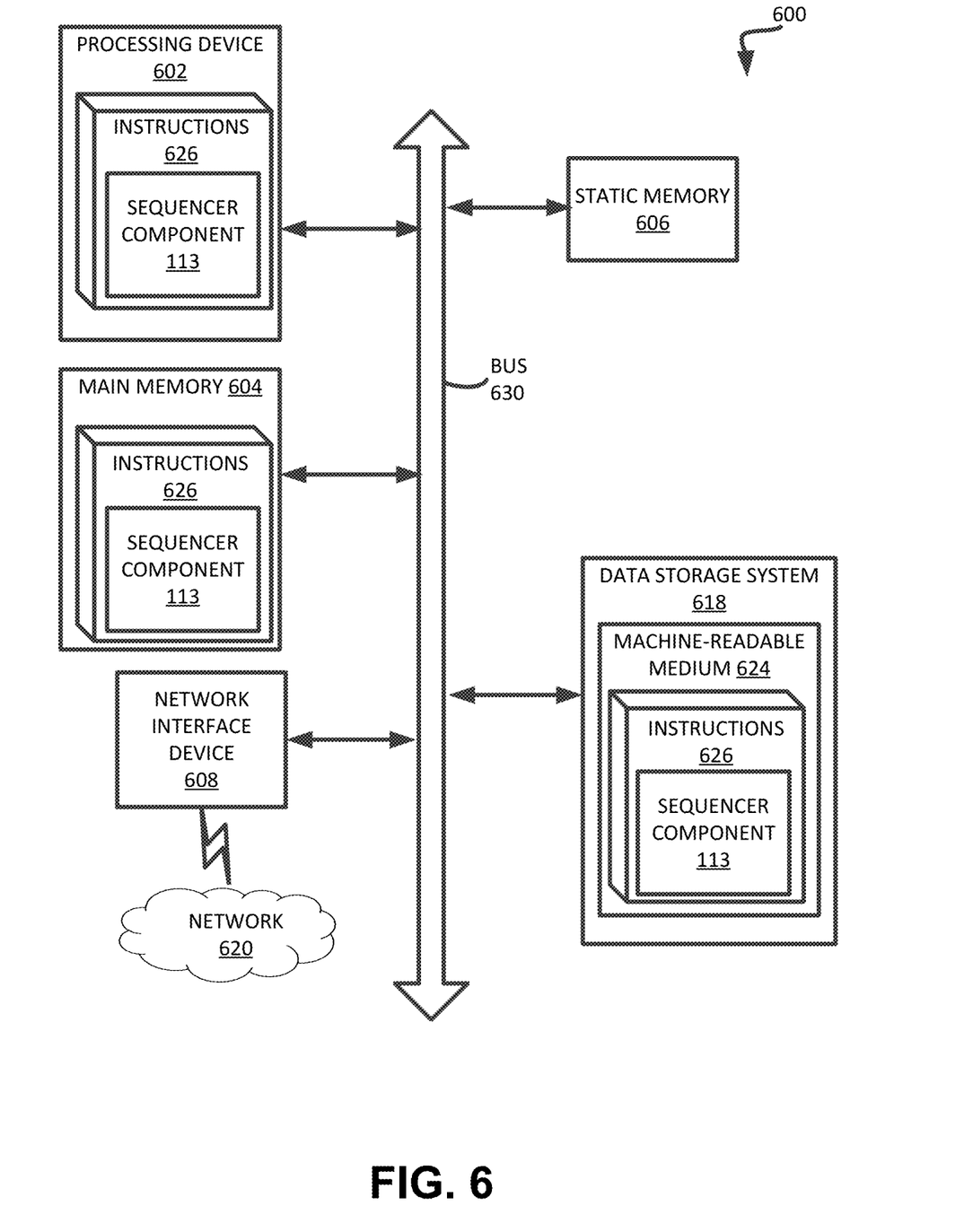
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the sequencer component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a sequencer component (e.g., the sequencer component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
one or more memory devices;
a sequencer component, operatively coupled to the one or more memory devices, the sequencer component to perform operations comprising:
  receiving a partition command from one of a plurality of write partition command queues or a plurality of read partition command queues, wherein the received partition command is issued to a command processor of the sequencer component to be applied to one of the one or more memory devices;
  responsive to receiving the partition command from the plurality of write partition command queues, determining whether a timeout threshold criterion pertaining to the plurality of read partition command queues is satisfied, wherein the timeout threshold criterion is satisfied if a period of time between a time stamp of at least one partition command from the plurality of read partition command queues and a current time exceeds a maximum duration of time a partition command of the plurality of read partition command queues can remain in a read partition command queue of the plurality of read partition command queues;
  responsive to determining that the timeout threshold criterion pertaining to the plurality of read partition command queues is not satisfied, determining whether a write threshold criterion pertaining to the plurality of write partition command queues is satisfied; and
  responsive to determining that at least one of the timeout threshold criterion pertaining to the plurality of read partition command queues or the write threshold criterion pertaining to the plurality of write partition command queues is satisfied, switching to receiving partition commands of the plurality of read partition command queues.

2. The system of claim 1, wherein the time stamp represents a time a respective partition command was received in the plurality of read partition command queue from a die command queue of the sequencer component.

3. The system of claim 1, wherein the write threshold criterion is satisfied in response to determining that a number of partition commands of the plurality of write partition command queues received meets or exceeds a write threshold.

4. The system of claim 3, wherein the write threshold comprises a larger of (i) a number of remaining partition commands of the plurality of write partition command queues or (ii) a product of a minimum number of partition commands of the plurality of write partition command queues to receive and a write transaction ratio.

5. The system of claim 1, wherein switching to receiving partition commands of the plurality of read partition command queues comprises determining whether at least one of the plurality of read partition command queues is ready to send a partition command and updating a read threshold.

6. The system of claim 1, wherein the sequencer component is to perform further operations comprising:
  responsive to determining that the timeout threshold criterion pertaining to the plurality of read partition command queues and the write threshold criterion pertaining to the plurality of write partition command queues are not satisfied, receiving an additional partition command from one of the plurality of write partition command queues.

7. A method comprising:
  receiving a partition command from one of a plurality of write partition command queues or a plurality of read partition command queues, wherein the received partition command is issued to a command processor of a sequencer component to be applied to one or more memory devices;
  responsive to receiving the partition command from the plurality of write partition command queues, determining whether a timeout threshold criterion pertaining to the plurality of read partition command queues is satisfied, wherein the timeout threshold criterion is satisfied if a period of time between a time stamp of at least one partition command from the plurality of read partition command queues and a current time exceeds a maximum duration of time a partition command of the plurality of read partition command queues can remain in a read partition command queue of the plurality of read partition command queues;
  responsive to determining that the timeout threshold criterion pertaining to the plurality of read partition command queues is not satisfied, determining whether a write threshold criterion pertaining to the plurality of write partition command queues is satisfied; and
  responsive to determining that at least one of the timeout threshold criterion pertaining to the plurality of read partition command queues or the write threshold criterion pertaining to the plurality of write partition command queues is satisfied, switching to receiving partition commands of the plurality of read partition command queues.

8. The method of claim 7, wherein the time stamp represents a time a respective partition command was received in the plurality of read partition command queues from a die command queue of the sequencer component.

9. The method of claim 7, wherein the write threshold criterion is satisfied in response to determining that a number of partition commands of the plurality of write partition command queues received meets or exceeds a write threshold.

10. The method of claim 9, wherein the write threshold comprises a larger of (i) a number of remaining partition commands of the plurality of write partition command queues or (ii) a product of a minimum number of partition commands of the plurality of write partition command queues to receive and a write transaction ratio.

11. The method of claim 7, wherein switching to receiving partition commands of the plurality of read partition command queues comprises determining whether at least one of the plurality of read partition command queues is ready to send a partition command and updating a read threshold.

12. The method of claim 7, wherein the sequencer component to further:
  responsive to determining that the timeout threshold criterion pertaining to the plurality of read partition command queues and the write threshold criterion pertaining to the plurality of write partition command queues are not satisfied, receiving an additional partition command from one of the plurality of write partition command queues.

13. A non-transitory computer-readable storage medium comprising instructions that, when executed by a processing device, cause the processing device to perform operations comprising:
  receiving a partition command from a plurality of write partition command queues, wherein the received partition command is issued to a command processor to be applied to a memory device;

determining whether one of a first threshold criterion pertaining to a plurality of read partition command queues or a second threshold criterion pertaining to the plurality of write partition command queues is satisfied, wherein the first threshold criterion is satisfied if a period of time between a time stamp of at least one partition command from the plurality of read partition command queues and a current time exceeds a maximum duration of time a partition command of the plurality of read partition command queues can remain in a read partition command queue of the plurality of read partition command queues; and responsive to one of the first threshold criterion or the second threshold criterion is satisfied, switching to receiving a partition command from a plurality of read partition command queues, wherein the received partition command is issued to a command processor to be applied to the memory device.

14. The non-transitory computer-readable storage medium of claim 13, wherein the second threshold criterion is satisfied in response to determining a total number of received partition commands of the plurality of write partition command queues meets or exceeds a larger of (i) a minimum number of partition commands of the plurality of write partition command queues to receive or (ii) a product of a number of remaining partition commands of the plurality of write partition command queues and a write transaction ratio.

15. The non-transitory computer-readable storage medium of claim 13, wherein causing the processing device to further perform operations comprising:

responsive to the first threshold criterion and the second threshold criterion are not satisfied, receiving an additional partition command of the plurality of write partition command queues.

* * * * *